(12) United States Patent
Morisada

(10) Patent No.: US 7,102,090 B2
(45) Date of Patent: Sep. 5, 2006

(54) FRONT PANEL HAVING PUSH BUTTONS FORMED INTEGRALLY THEREWITH

(75) Inventor: Katsuhiro Morisada, Daito (JP)

(73) Assignee: Funai Electric Co., Ltd., Daito (JP)

( * ) Notice: Subject to any disclaimer, the term of this patent is extended or adjusted under 35 U.S.C. 154(b) by 656 days.

(21) Appl. No.: 10/438,270

(22) Filed: May 15, 2003

(65) Prior Publication Data

US 2004/0032542 A1   Feb. 19, 2004

(30) Foreign Application Priority Data

May 16, 2002   (JP)   ............................. 2002-002832

(51) Int. Cl.
*H01H 13/04* (2006.01)
*H01H 13/08* (2006.01)
(52) U.S. Cl. ...................... 200/296; 200/293; 200/343; 200/331
(58) Field of Classification Search ........ 200/293–296, 200/331–332, 343–344, 520, 556
See application file for complete search history.

(56) References Cited

U.S. PATENT DOCUMENTS 6,051,799 A * 4/2000 Fuhrmann .................. 200/331
6,392,179 B1 * 5/2002 Schwarzbich ............... 200/520
6,570,111 B1 * 5/2003 Nakagawa et al. .......... 200/343
6,914,206 B1 * 7/2005 Mukougawa ............... 200/556
6,933,454 B1 * 8/2005 Ishibashi et al. ............ 200/341

FOREIGN PATENT DOCUMENTS

| JP | 02-121815 | 5/1990 |
|---|---|---|
| JP | 03-127417 | 5/1991 |
| JP | 05-278076 | 10/1993 |
| JP | 2001-043770 | 2/2001 |

* cited by examiner

*Primary Examiner*—Kyung Lee
(74) *Attorney, Agent, or Firm*—Crowell & Moring LLP

(57) ABSTRACT

A front panel for electrical equipment is provided that has a plurality of push buttons formed integrally with the front panel and requires no additional panel for covering around the push buttons while being excellent in appearance. Each of the push buttons is linked to the face plate of the front panel through a button supporting portion and a button arm. The button supporting portion is extended from the back of the face plate at a substantially right angle to the face plate. The button arm is extended from the rear end of the button supporting portion so as to be parallel to the face plate. The face plate and the button arm are arranged, with a space formed by removing a slidable core, to overlap each other when viewed from front. Thus, the front panel does not require any additional cover panel.

4 Claims, 6 Drawing Sheets

FRONT PANEL HAVING PUSH BUTTONS FORMED INTEGRALLY THEREWITH

BACKGROUND OF THE INVENTION

The present invention relates to front panels to be installed in the front of electrical equipment such as video cassette recorders or the like.

Conventionally, the push buttons of a front panel for electrical equipment are formed separately from the main panel. In the subsequent assembling of the front panel, the push buttons are fitted to the main panel and joined to the main panel by welding for example. However, the front panel to be constructed in such a manner requires increased components as well as increased steps in assembling, thus hardly reducing the manufacturing cost of the front panel. Therefore, a front panel has been proposed that has push buttons formed integrally with the main panel.

FIG. 7 shows a cross section of the front part of a video cassette recorder having such a front panel. A front panel 100 includes a main panel 102 for covering the front of electrical equipment, push buttons 103 for entering a variety of commands from a user, and a cover panel 104 for ornament around the push buttons. The push button 103 is formed integrally with the main panel 102. The cover panel 104 is formed separately from them and then mounted on the main panel 102. The main panel 102 has a recessed base 105 for accommodating the push button 103. The push button 103 has a bridge 106 so as to be formed integrally with the base 105 through the bridge. The bridge 106 is provided under the push button 103, and there is a groove 107 around the push button 103 except the bridge 106. The back of the push button 103 has a switch operating arm 108 formed integrally therewith for operating a push-button switch 62. The push-button switch 62 is mounted on a mounting board 61 provided on a chassis 6. When the push button 103 is pressed, the bridge 106 is bent so that the end of the switch operating arm 108 presses the push-button switch 62 for operation. The front panel 100 needs the cover panel 104 provided on the main panel 102 for covering up the bridge 106 and the groove 107 because it is not preferable in view of appearance to have the bridge 106 and the groove 107 exposed at the front of the front panel. Thus, the front panel has double panels, i.e. the cover panel 104 and the base 105, at the lower part of the main panel 102.

There are known molded panels for use in electrical equipment such as rice cookers or the like that are arranged to join push buttons and a main panel by using an additional ornamental film (see, for example, Japanese Patent Laid-open Publication No. 2001-43770). Further, there are known front panels that have a main panel and push buttons formed integrally therewith both of which are made of elastic and thermoplastic elastomer resin (see, for example, Japanese Patent Laid-open Publication Nos. HEI 2-121815 and HEI 3-127417). A method of injection molding of hollow panels are also known that includes the step of forming a rib inside the panel for reinforcement so as to decrease the deformation due to load (see, for example, Japanese Patent Laid-open Publication No. HEI 5-278076).

However, either the front panel as shown in FIG. 7 or the molded panel as disclosed in the Japanese Patent Laid-open Publication No. 2001-43770 requires any additional component, e.g. the cover panel 104 or the ornamental film, thus failing to reduce the components and the assembling steps. Since the panel as disclosed in the Japanese Patent Laid-open Publication No. HEI 2-121815 or HEI 3-127417 is made of elastic elastomer resin, it is liable to deformation, thus not favorable as front panels for electrical equipment.

SUMMARY OF THE INVENTION

The present invention has been made to solve the above mentioned problems, and it is an object of the present invention to provide a front panel having push buttons formed integrally therewith that requires no additional cover panel while being excellent in appearance, thus reducing the components and the steps in assembling for cost reduction.

An aspect of the present invention provides a front panel for electrical equipment, comprising push buttons formed integrally therewith, the push button having a front surface exposed from an opening formed in a face plate of the front panel, wherein the push button is linked to the face plate of the front panel through a button supporting portion and a button arm, the button supporting portion extending from the back of the face plate, and the button arm being formed integrally with the button supporting portion and extending from the button supporting portion so as to be substantially parallel to the face plate, wherein the button arm has a switch operating member formed integrally therewith, wherein the button supporting portion has an opening, between the region in which the button arm is provided and the back of the face plate of the front panel, formed by removing an upper part of a slidable core sliding in a direction perpendicular to a mold opening direction in which a core part or a cavity part of a mold for forming the front panel is moved for separation from each other, and wherein the face plate of the front panel and the button arm are arranged, with a space formed by removing the slidable core therebetween, to overlap each other when viewed from front.

According to the present invention, the push buttons are linked to the back of the face plate of the front panel through the button supporting portion and the button arm. In other words, the push buttons are formed integrally with the front panel. The button arm is formed integrally with the push button and the button supporting portion so as to face the face plate of the front panel in parallel to the face plate. This causes the face plate of the front panel and the button arm to overlap each other, thus permitting the face plate positioned in front to cover around the button arm for eliminating the cover panel as required in conventional structure. The switch operating member formed integrally with the button arm puts the switch in operation when the push button is pressed. Since the push button is linked to the face plate of the front panel with the button supporting portion and the button arm, secure push stroke of the push button can be easily provided.

In a preferred embodiment of the present invention, the front panel comprises a plurality of push buttons arranged in a row at appropriate intervals. In this arrangement, the openings and the spaces to be defined by the upper parts of the slidable core are in a row, corresponding to the respective push buttons that are arranged in a row at appropriate intervals. Accordingly, a unitary slidable core can be used that has a comblike structure with a plurality of upper parts branched, for easy sliding.

In a preferred embodiment of the present invention, the front panel further comprises a bottom plate extending backward from a lower part of the face plate of the front panel, wherein the bottom plate has an opening formed by removing the upper part of the slidable core and a fence extending from around the opening toward the bottom of the button supporting portion, the fence functioning as a static electricity shield. According to the embodiment of the present invention, the fence surrounding the periphery of the opening formed in the bottom plate can protect the electronic parts of the front panel from static electricity if a finger of a user with static electricity comes near the opening of the bottom plate of the front panel.

Another aspect of the prevent invention provides a front panel for electrical equipment, comprising push buttons formed integrally therewith, the front panel being made of resin, and the push button having a front surface exposed from an opening formed in a face plate of the front panel with a clearance formed between the push button and the face plate, wherein a plurality of push buttons are arranged in a row at appropriate intervals, wherein each of the push buttons is linked to the face plate of the front panel through a platelike button supporting portion and a platelike button arm, the button supporting portion being formed integrally with the face plate and extending from the back of the face plate at a substantially right angle to the face plate, and the button arm being formed integrally with the button supporting portion and extending from a rear end of the button supporting portion so as to be substantially parallel to the face plate, wherein the button arm has a back face formed integrally with a switch operating arm extending backward at a substantially right angle to the button arm, wherein the button supporting portion has an opening, between the region in which the button arm is provided and the back of the face plate of the front panel, formed by removing an upper part of a slidable core sliding in a direction perpendicular to a mold opening direction in which a core part or a cavity part of a mold for forming the front panel is moved for separation from each other, and wherein the face plate of the front panel and the button arm are arranged, with a space formed by removing the slidable core therebetween, to overlap at only the area of the button arm when viewed from front.

According to the present invention, the plurality of push buttons are linked to the back of the face plate of the front panel through the button supporting portion and the button arm each shaped like a plate. In other words, the push buttons are formed integrally with the front panel. The button arm is formed integrally with the push button and the button supporting portion so as to face the face plate of the front panel in parallel thereto. This causes the face plate of the front panel and the button arm to overlap each other at only the area of the button arm, thus permitting the face plate positioned in front to cover around the button arm for eliminating the cover panel. The push button is linked to the face plate of the front panel with the button supporting portion and the button arm, which easily providing secure push stroke of the push button. The switch operating arm extending from the back face of the button arm can provide increased push stroke of the push button so as to ensure operation of the switch. Since the push buttons are arranged in a row at appropriate intervals, the openings and the spaces to be defined by the upper parts of the slidable core are arranged in a row corresponding to the respective push buttons. Accordingly, a unitary slidable core can be used that has a comblike structure with a plurality of upper parts branched, for easy sliding.

DETAILED DESCRIPTION OF THE PREFERRED EMBODIMENT OF THE PRESENT INVENTION

Figure 1:
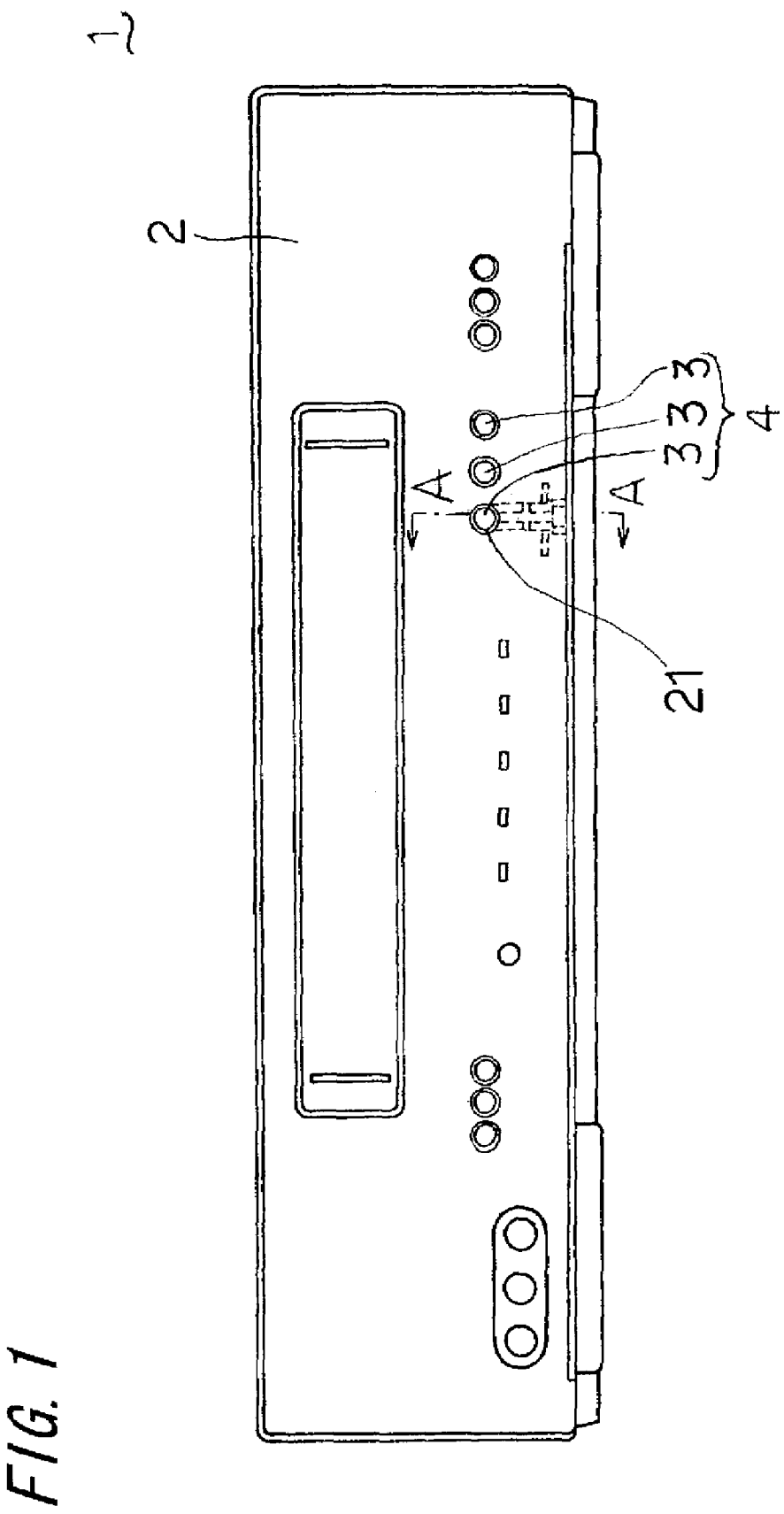
FIG. 1 is a front view of a front panel for a video cassette recorder according to one embodiment of the present invention.
Figure 2:
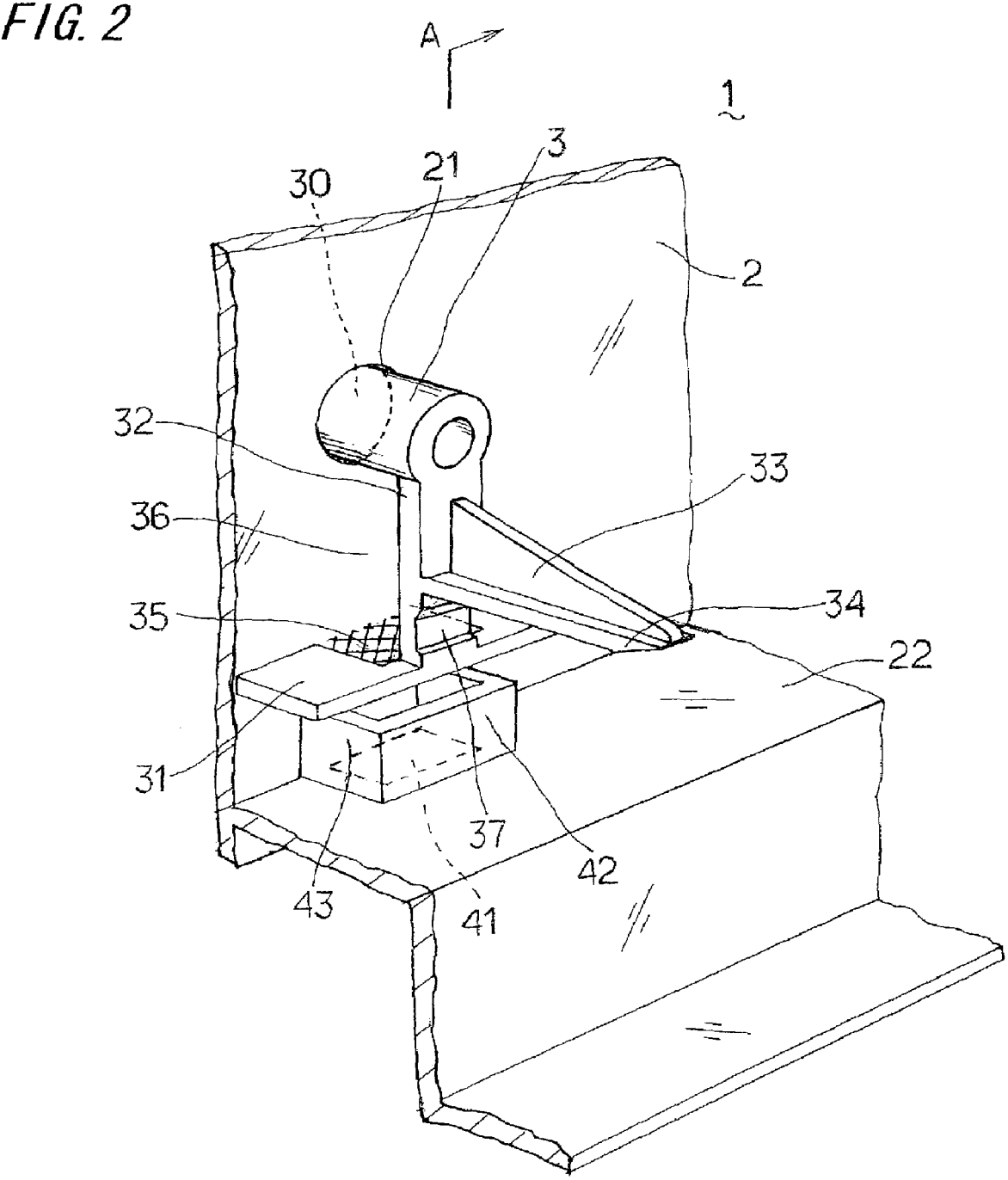
FIG. 2 is a perspective view showing a structure of a push button formed at the back of the front panel.
Figure 3:
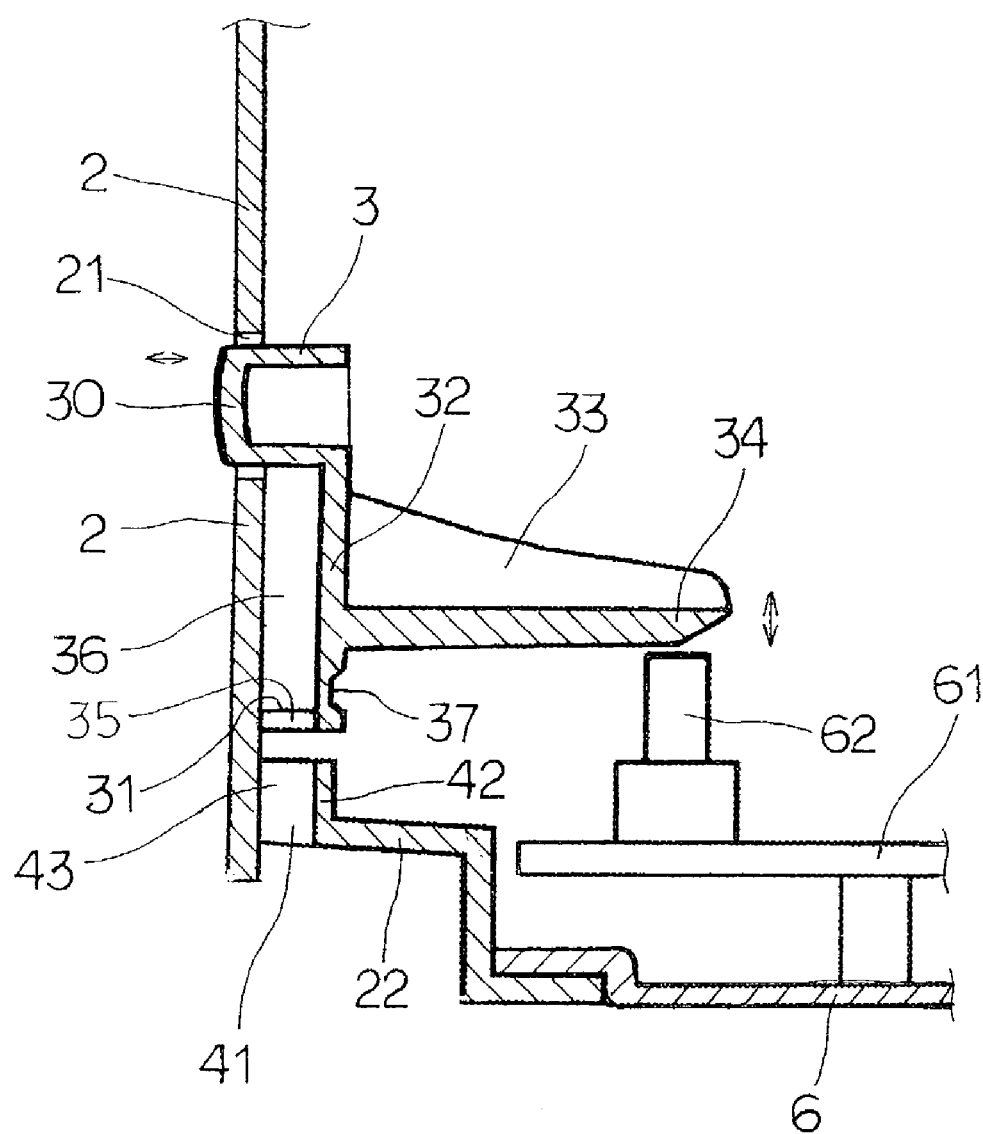
FIG. 3 is a sectional view of the front panel shown in FIG. 2 taken along section lines A—A.
Figure 4:
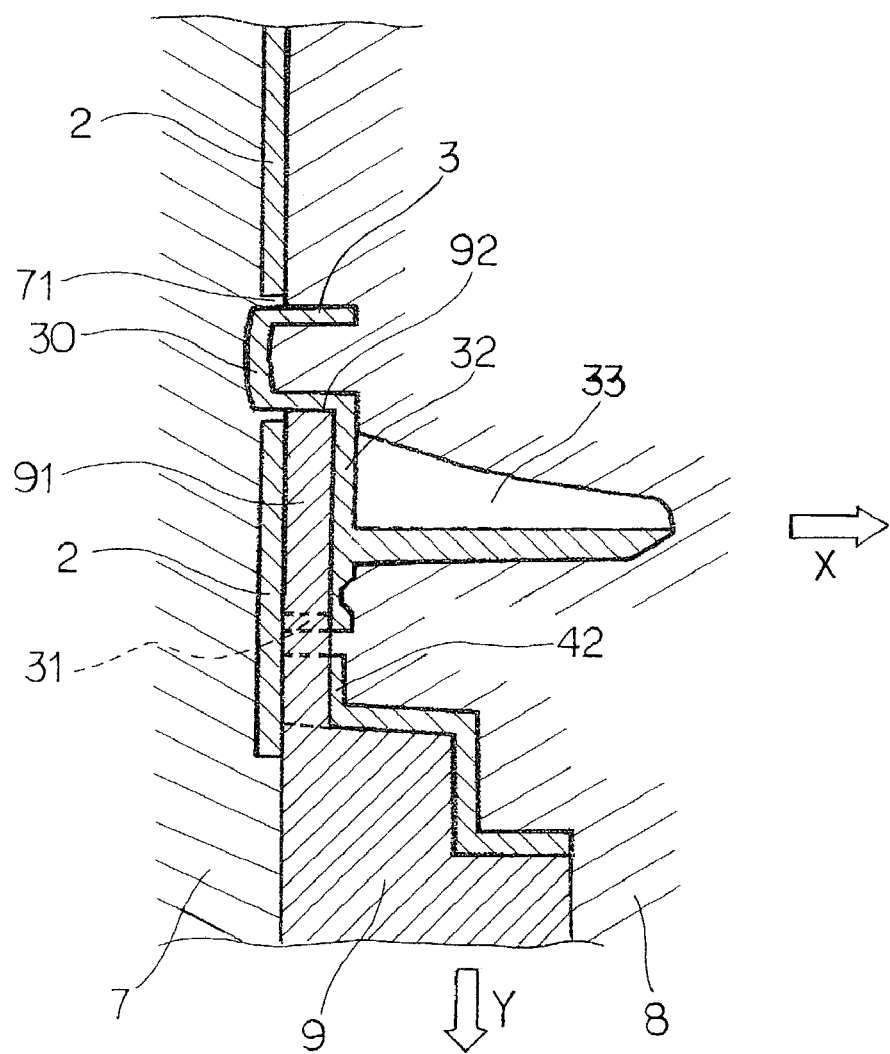
FIG. 4 is a sectional view of the front panel shown in FIG. 2, together with a mold therefor, taken along section lines A—A.

Now, a front panel for a video cassette recorder according to one embodiment of the present invention will be described, referring to the accompanying drawings. FIG. 1 shows a front view of the front panel, FIG. 2 shows the structure of a push button disposed at the back of the front panel, and FIG. 3 shows the front panel taken along section lines A—A. The front panel 1 is made of resin and installed in the front of a video cassette recorder. The front panel 1 includes a face plate 2 serving as the front surface of the video cassette recorder and a set of buttons 4 composed of a plurality of push buttons 3 for inputting a variety of operation commands from a user to the video cassette recorder. As shown in FIG. 4, the face plate 2 and the set of buttons 4 are formed integrally to each other by injection molding with a mold including a cavity part 7, a core part 8, and a slidable core 9. As can be seen from FIG. 1, push buttons 3 in each button set 4 are arranged in a row at appropriate intervals. It is not necessary to arrange button sets 4 in a row, but they may be located at different heights. Detailed description will be made below as to a push button 3.

The face plate 2 of the front panel has an opening 21 from which the front surface 30 of the push button 3 is exposed. The push button 3 is linked to the back of the face plate 2 through a platelike button supporting portion 31 and a platelike button arm 32. This allows the front surface of the push button to be positioned away from the lower end 37 of the button arm 32, thus easily providing secure push stroke of the push button 3. The button supporting portion 31 is formed integrally with the face plate 2 and extends from the back of the face plate 2 at a substantially right angle thereto. The button supporting portion 31 has an opening 35, the cross-hatched area in FIG. 2, formed by removing the slidable core 9.

As shown in FIG. 4, the slidable core 9 is a mold for forming the button arm 32 to be arranged parallel to the face plate 2, and it can be slide in the direction denoted by Y perpendicular to the mold opening direction denoted by X in which the core part 8 of the mold is moved. The button arm 32 is formed integrally with the button supporting portion 31 and extends from the rear end of the button supporting portion 31. Further, the button arm 32 is arranged to be parallel to the face plate 2 with a space 36, which is defined by the slidable core 9. In other words, the face plate 2 and the button arm 32 are arranged, with the space 36 therebetween, so as to overlap each other when viewed from front. Accordingly, the face plate 2 can cover around the button arm 32, thus successfully eliminating such a cover panel as required in conventional structure. This can contribute to reductions in the components and the steps in assembling of the front panel. The button arm 32 has a switch operating arm 33 formed integrally with the back face thereof. The switch operating arm 33 extends backward at a substantially right angle to the button arm 32 so that an end 34 of the switch operating arm faces a push-button switch 62. The push-button switch 62 is mounted on a mounting board 61 provided on a chassis 6. When the push button 3 is pressed, a lower part 37 of the button arm 32 is bent primarily, whereby the end 34 of the switch operating arm 33 depresses the push-button switch 62. As described above, the switch operating arm 33 is formed integrally with the button arm 32 in a manner so that it extends backward from the back of the button arm 32 at the substantially right angle. Therefore, by increasing the length of the switch operating arm 33, the push stroke of the push button 3 can be increased for secure operations of the push-button switch 62. The under side of the end 34 of the switch operating arm 33 is tapered. This can prevent interference between the end 34 of the switch operating arm and the upper end of the push-button switch 62 when attaching the front panel 1 to the main body of the video cassette recorder, thus facilitating the attachment of the front panel 1.

Figure 6:
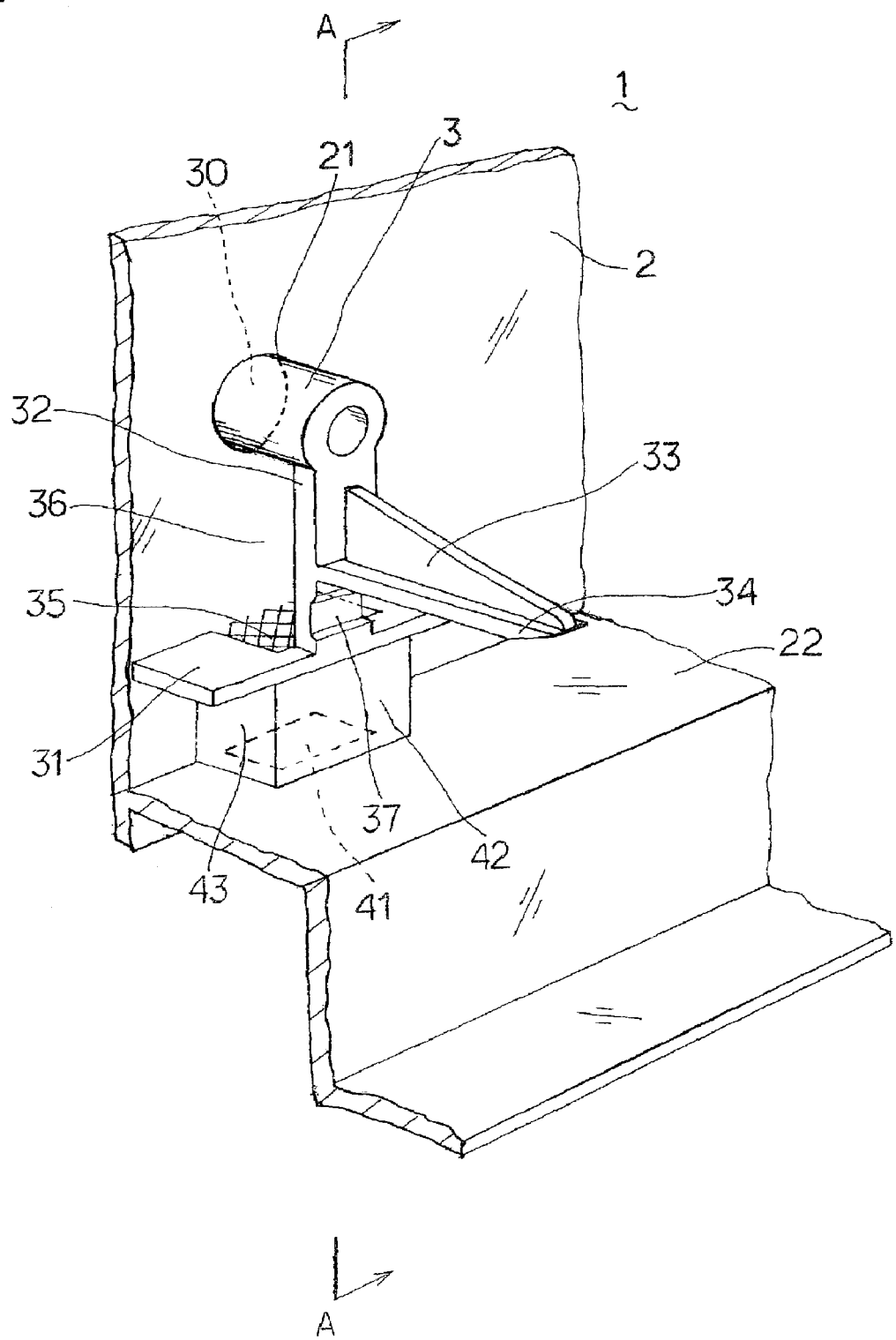
FIG. 6 is a perspective view showing another structure of the push button.
Figure 7:
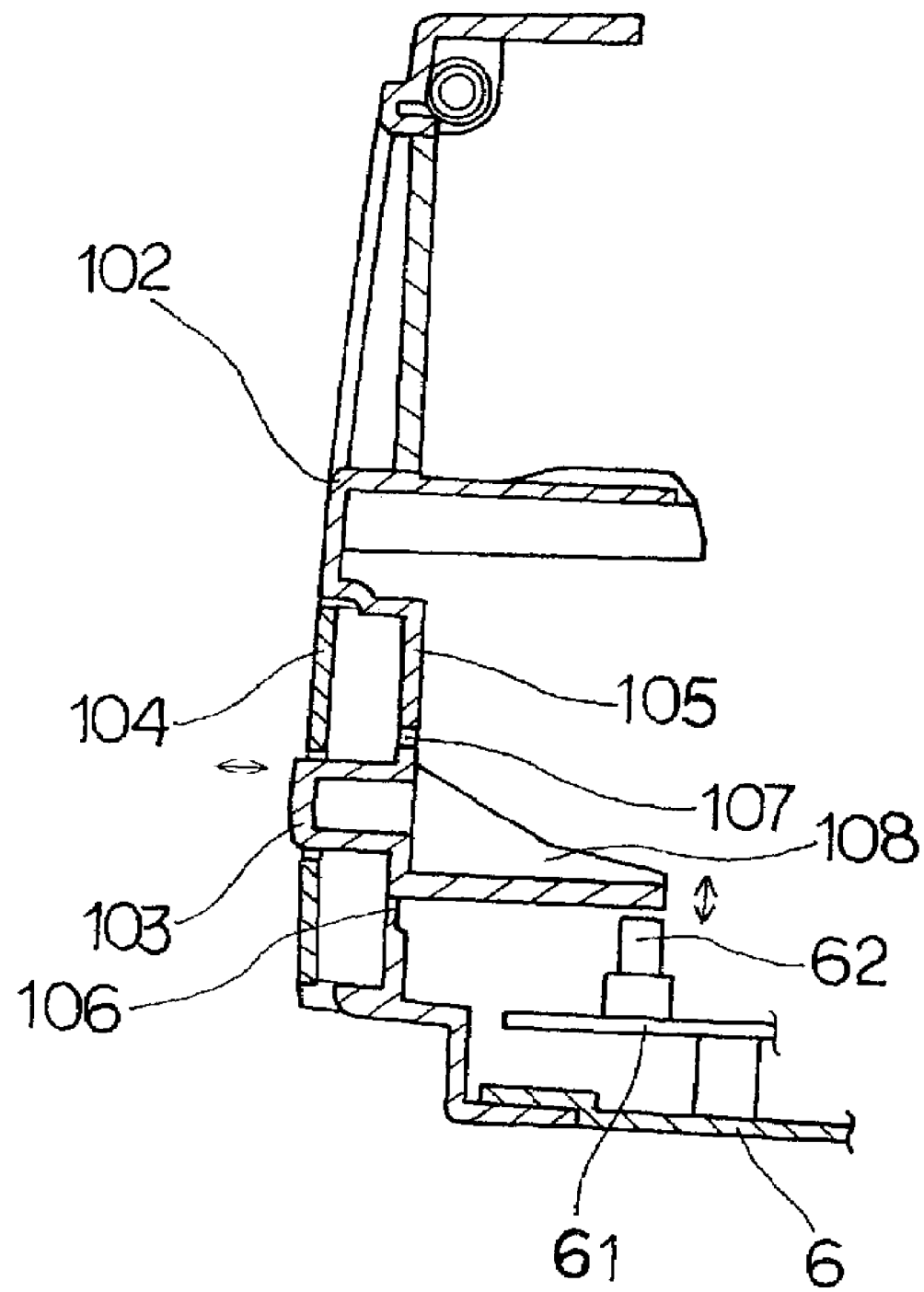
FIG. 7 is a sectional view of a conventional front panel.

The front panel 1 has a bottom plate 22 extending backward from the lower part. The bottom plate 22 has an opening 41 formed by removing the slidable core 9. Further, the bottom plate 22 has fences 42 and 43 surrounding the opening 41 and extending toward the under surface of the button supporting portion 31. The fences 42 and 43 function as a static electricity shield for protecting the video cassette recorder from static electricity on the body of a user when a finger of the user comes near the opening 41. Additionally, the fences 42 and 43 can prevent dust and the like from entering the video cassette recorder through the opening 41. As shown in FIG. 6, the fences 42 and 43 may be configured to be in contact with the button supporting portion 31 and the button arm 32. This can provide more secure protection from the static electricity.

Figure 5:
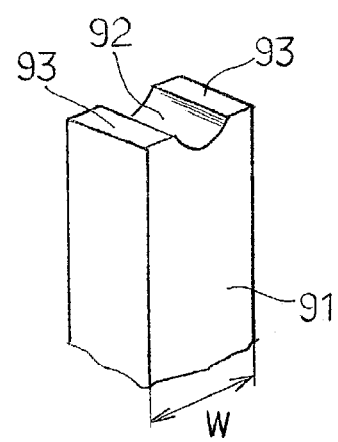
FIG. 5 is a perspective view of the upper part of a slidable core for use in molding of the front panel.

Referring now to FIG. 4, molding process of the front panel 1 will be described. At the time of injection molding of the front panel 1, the cavity part 7, the core part 8, and the slidable core 9 engage one another in the mold closed position shown in FIG. 4. As shown in FIG. 5, the slidable core 9 has an upper part 91 of which the upper surface has a recess 92 for forming the under surface of the push button 3 and a planar surface 93 for abutting on the abutment surface (not shown) of the core part 8 when the mold is closed. The width of the opening 35 or 41 is substantially identical to the width W of the upper part 91 of the slidable core 9. It should be noted that in practice, the opening 41 is configured to be slightly wider than the opening 35, for ease of removal of the slidable core 9.

By injecting resin into the space formed by the cavity part 7, the core part 8, and the slidable core 9 of the mold, the face plate 2 and the push button 3 are formed integrally to each other through the button supporting portion 31 and the button arm 32. The button arm 32 is formed integrally with the push button 3 and the button supporting portion 31 by the core part 8 of the mold while being made parallel to the face plate 2 by the slidable core 9. Thus, the face plate 2 and the button arm 32 are arranged to face each other so that they overlap when viewed from front. In this front panel, it is only the area of the button arms 32 where the face plate 2 and the button arms 32 overlap when viewed from front. This can reduce the amount of resin required for forming the front panel, thus contributing to reduction of the manufacturing cost of the front panel, as compared with any conventional structure that has double panels at the area of the cover panel. The cavity part 7 of the mold has a cylindrical projection 71 for forming the opening 21 in the face plate 2, i.e. the clearance between the face plate 2 and the push button 3. In the case where the push button 3 is configured to be a rectangular column, the projection of the cavity part 7 is configured rectangular. After the injection molding is completed, the slidable core 9 is removed in the direction denoted by Y, the mold core part 8 is moved in the mold opening direction denoted by X, and then the molded part or front panel 1 is ejected from the mold core part 8.

Since the push buttons 3 are arranged in a row at appropriate intervals as described above, the openings 35 and 41 and the spaces 36 to be defined by the upper parts 91 of the slidable core 9 are arranged in a row corresponding to the respective operation buttons 3. Therefore, a unitary slidable core 9 can be used that has a comblike structure with a plurality of upper parts 91 branched, for easy sliding.

The present invention is not limited to the above embodiment, but can be modified in a variety of ways. For example, the button supporting portion 31 may be configured to be like a block, instead of being like a plate. Also, the button arm 32 may be configured in a rodlike shape rather than in the platelike shape. Further, the switch operating arm 33 employed in the above described embodiment may be replaced with any member for operating the push-button switch 62 if the member is formed integrally with the button arm 32.

What is claimed is:

1. A front panel for electrical equipment, comprising push buttons formed integrally therewith, the push button having a front surface exposed from an opening formed in a face plate of the front panel,
   wherein the push button is linked to the face plate of the front panel through a button supporting portion and a button arm, the button supporting portion extending from the back of the face plate, and the button arm being formed integrally with the button supporting portion and extending from the button supporting portion so as to be substantially parallel to the face plate,
   wherein the button arm has a switch operating member formed integrally therewith,
   wherein the button supporting portion has an opening, between a region in which the button arm is provided and the back of the face plate of the front panel, formed by removing an upper part of a slidable core sliding in a direction perpendicular to a mold opening direction in which a core part or a cavity part of a mold for forming the front panel is moved for separation from each other, and
   wherein the face plate of the front panel and the button arm are arranged, with a space formed by removing the slidable core therebetween, to overlap each other when viewed from front.

2. A front panel according to claim 1, wherein a plurality of push buttons are arranged in a row at appropriate intervals.

3. A front panel according to claim 1, further comprising a bottom plate extending backward from a lower part of the face plate of the front panel,
   wherein the bottom plate has an opening formed by removing the upper part of the slidable core and a fence extending from around the opening toward the bottom of the button supporting portion, the fence functioning as a static electricity shield.

4. A front panel for electrical equipment, comprising push buttons formed integrally therewith, the front panel being made of resin, and the push button having a front surface exposed from an opening formed in a face plate of the front panel with a clearance formed between the push button and the face plate, wherein a plurality of push buttons are arranged in a row at appropriate intervals, wherein each of the push buttons is linked to the face plate of the front panel through a platelike button supporting portion and a platelike button arm, the button supporting portion being formed integrally with the face plate and extending from the back of the face plate at a substantially right angle to the face plate, and the button arm being formed integrally with the button supporting portion and extending from a rear end of the button supporting portion so as to be substantially parallel to the face plate, wherein the button arm has a back face formed integrally with a switch operating arm extending backward at a substantially right angle to the button arm, wherein the button supporting portion has an opening, between the region in which the button arm is provided and the back of the face plate of the front panel, formed by removing an upper part of a slidable core sliding in a direction perpendicular to a mold opening direction in which a core part or a cavity part of a mold for forming the front panel is moved for separation from each other, and wherein the face plate of the front panel and the button arm are arranged, with a space formed by removing the slidable core therebetween, to overlap at only the area of the button arm when viewed from front.

* * * * *